United States Patent
Porikli et al.

(10) Patent No.: US 7,840,061 B2
(45) Date of Patent: Nov. 23, 2010

(54) METHOD FOR ADAPTIVELY BOOSTING CLASSIFIERS FOR OBJECT TRACKING

(75) Inventors: Fatih M. Porikli, Watertown, MA (US); Toufiq Parag, Edison, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 939 days.

(21) Appl. No.: 11/679,940

(22) Filed: Feb. 28, 2007

(65) Prior Publication Data

US 2008/0205750 A1 Aug. 28, 2008

(51) Int. Cl.
*G06K 9/00* (2006.01)
*G06K 9/62* (2006.01)
*G06K 9/36* (2006.01)

(52) U.S. Cl. .................. 382/159; 382/103; 382/155; 382/156; 382/160; 382/224; 382/291

(58) Field of Classification Search .................. 382/159, 382/103, 155, 156, 160, 199, 224, 291
See application file for complete search history.

(56) References Cited

U.S. PATENT DOCUMENTS

| 7,024,033 B2* | 4/2006 | Li et al. ........... 382/159 |
| 7,031,513 B1* | 4/2006 | Kondo ............. 382/155 |
| 7,203,669 B2* | 4/2007 | Lienhart et al. ...... 706/48 |
| 7,526,101 B2* | 4/2009 | Avidan ............ 382/103 |
| 7,668,790 B2* | 2/2010 | Barbu et al. ......... 706/25 |
| 2006/0053342 A1* | 3/2006 | Bazakos et al. ....... 714/37 |
| 2006/0165258 A1* | 7/2006 | Avidan ............ 382/103 |
| 2009/0196464 A1* | 8/2009 | Dimitrova et al. ...... 382/118 |

OTHER PUBLICATIONS

Friedman, et al. "Additive Logistic Regression: a Statistical View of Boosting." Annals of Statistics. 28. (1998): 1-44. Print.*
Grabner, et al. "On-line Boosting and Vision." Proceedings of the 2006 IEEE Computer Society Conference on Computer Vision and Pattern Recognition (CVPR '06). 1. (2006): 1-8. Print.*
Oza, et al. "Online Bagging and Boosting." In Artificial Intelligence and Statistics 2001. (2001): 105-112. Print.*
Rätsch, et al. "Soft Margins for AdaBoost." Machine Learning. 42. (2001): 287-320. Print.*
Grabner et al. "On-line Boosting and Vision." Proceedings of the 2006 IEEE Computer Society Conference on Computer Vision and Pattern Recognition (CVPR '06). 1. (2006): 1-8. Print.*
Friedman et al. "Additive Logistic Regression: a Statistical View of Boosting." Annals of Statistics. 28. (1998): 1-44. Print.*
Avidan, S. "Ensemble Tracking." IEEE International Conference on Computer Vision and Pattern Recognition (CVPR). (2005): 1-8. Print.*
Ong, et al. "A Boosted Classifier Tree for Hand Shape Detection." Automatic Face and Gesture Recognition, 2004. Proceedings. Sixth IEEE International Conference on. (2004): 889-894. Print.*
Jerome Friedman et al., Additive Logistic Regression: A Statistical View of Boosting, The Annals of Statistics 2000, vol. 28, No. 2, 337-407.

* cited by examiner

*Primary Examiner*—Bhavesh M Mehta
*Assistant Examiner*—Michael A Newman
(74) *Attorney, Agent, or Firm*—Dirk Brinkman; Gene Vinokur

(57) ABSTRACT

A method adapts a boosted classifier to new samples. A boosted classifier is trained using initial samples. The boosted classifier is a combination of weak classifiers. Each weak classifier of the boosted classifier is updated adaptively by adding contributions of new samples and deleting contributions old samples.

12 Claims, 5 Drawing Sheets

OnlineBoost

For each set of new data $X_+$

1. Start with uniform distribution $w$ and $t = 1$.
2. Repeat $T$ times
   (a) WeakLearn($W$).
   (b) Select $h_t(x) = \arg\min_{1 \leq j \leq J} \sum_i w_i |y_i - h_j(x_i)|$.
   (c) Update and normalize $w$.
   (d) Subtract quantities related to $X_{-M}$ according to Equation 4.

— 201

WeakLearn($W$)

1. Compute new quantities for $X_+$.
2. Learn $\beta$ according to Equation 3.

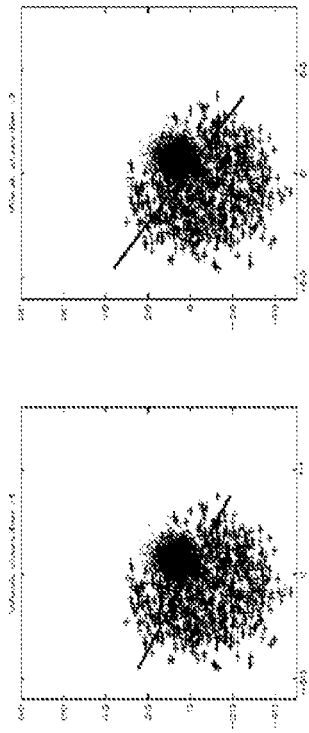
*Fig. 4A* t = 2
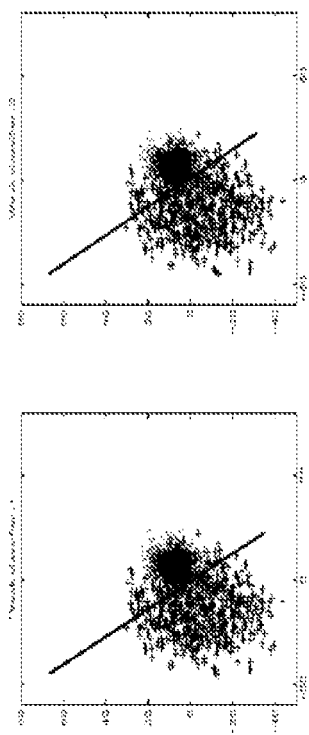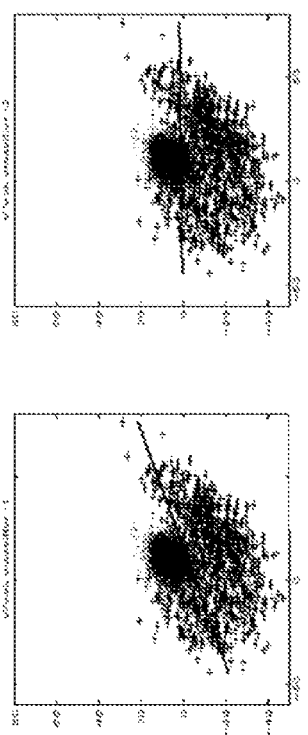
*Fig. 4B* t = 3
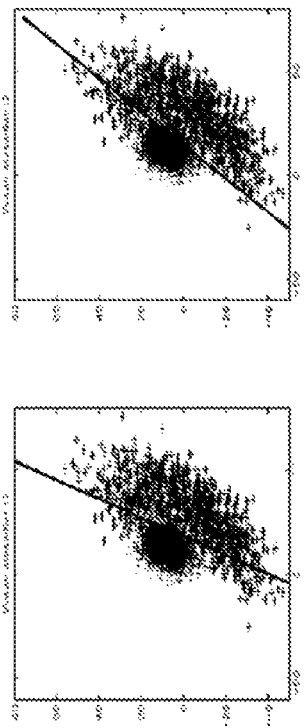
*Fig. 4C* t = 4
*Fig. 4D* t = 5
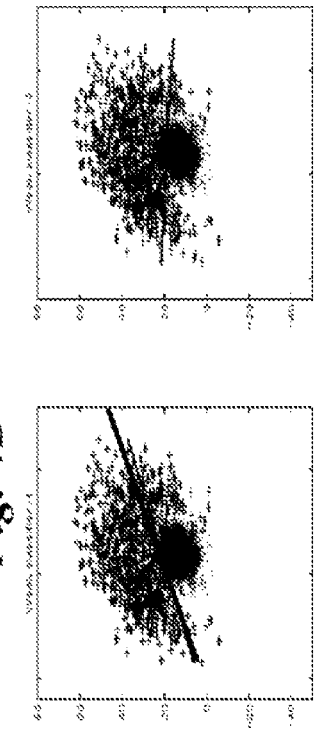
*Fig. 4E* t = 6
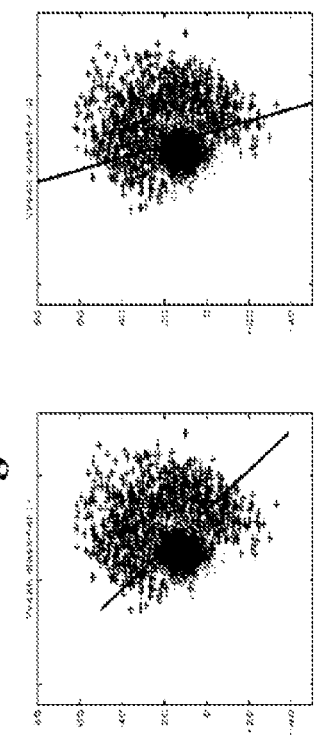
*Fig. 4F* t = 7

METHOD FOR ADAPTIVELY BOOSTING CLASSIFIERS FOR OBJECT TRACKING

FIELD OF THE INVENTION

The invention relates generally to machine learning, and more particularly to tracking objects in videos using a boosted classifier.

BACKGROUND OF THE INVENTION

Object tracking is used in many computer vision applications, see Stauffer et al., "Training Patterns of Activity Using Real-Time Tracking," PAMI, 22(8), pp. 747-757, 2000, Avidan, "Support Vector Tracking," IEEE Trans. on Pattern Analysis and Machine Intelligence, 2004; and human-computer interactions, Bobick et al., "The Kids Room," Communications of the ACM, 43(3), 2000.

The wide range of objects to be tracked poses a challenge to any object tracking application. Different object and feature representations such as color histograms, appearance models or key-points, have been used for object tracking. Feature selection can use a set of different feature spaces and 'switch' to the most discriminative features, Collins et al., "On-Line Selection of Discriminative Tracking Features," Proceedings of the International Conference on Computer Vision (ICCV '03), 2003.

Object tracking can use a Kalman filter, or a particle filter. Temporal integration methods, such as particle filtering, integrate measurements over time, Isard et al., "CONDENSATION—Conditional Density Propagation for Visual Tracking," International Journal of Computer Vision, Vol 29(1) pp. 5-28, 1998. Filtering assigns probabilities to different matches. Unfortunately, filter methods do not affect a description of the object.

Mean-shift methods can also be used. Mean shift is a mode-seeking process that works on the gradient of distribution to find a peak. Mean-shift searches for regions in an image that has a color histogram similar to a given color histogram. To improve performance, Comanciu et al. used spatial smoothing, Comanciu et al, "Kernel-Based Object Tracking," IEEE Trans. on Pattern Analysis and Machine Intelligence, (PAMI), 25:5, pp. 564-575. In addition, colors that appear outside the object are used to 'down-weight' colors that appear on the object.

Simple object tracking finds a region in a sequence of frames of a video that matches an object. In terms of machine learning, this is equivalent to a nearest neighbor classification. A simple approach ignores the role of the background. Therefore, object classifiers can be used for object tracking, see Shai Avidan, "Ensemble tracking," IEEE Conference on Computer Vision and Pattern Recognition, pages 494-501, 2005, and Helmut Grabner and Horst Bischof, "On-line boosting and vision," IEEE Conference on Computer Vision and Pattern Recognition, pages 260-267, 2006, and U.S. Patent Application 20060165258, "Tracking objects in videos with adaptive classifiers," filed by Avidan Jan. 24, 2005.

The classifier based methods 'train' a binary classifier to distinguish the object of interest from the background in the scene. Then, the classifier is applied to a sequenced of images to locate and track the position of the object. Often, a strong classifier combines a set of weak classifiers. The combination can be linear or non-linear. For example, the well-known AdaBoost process trains each classifier in a set of weak classifier on increasingly more 'difficult' training data. The weak classifiers are then combined to produce a strong classifier that is better than any of the weak classifiers alone, Freund et al., "A decision-theoretic generalization on-line training and an application to boosting," Computational Training Theory, Eurocolt '95, pp. 23-37, 1995, incorporated herein by reference.

One problem with the classifier based methods is adapting the classifier to scene changes over time while continuing to track the object correctly. It should be noted that the appearance of both the background and the object can change with time. For example, items can appear or disappear in the scene over time, and for many scenes, particularly outdoor scenes, incident lighting and shadows vary over time and space.

Conventional classifier based methods update the strong classifiers by adding and deleting weak classifiers over time to cope with the scene changes. The Avidan ensemble tracking does not try to update the weak classifiers themselves. Instead, 'old' weak classifiers are deleted and 'new' weak classifiers are added. The Grabner et al. on-line boosting method models the feature densities by Gaussian distributions. They update their parameters at each frame using a Kalman filtering methods. The method of Grabner et al. also deletes any weak classifier generating an error greater than a predetermined threshold, e.g., 0.5 or 50%. This eliminates the possibility that the deleted weak classifier could be used effectively later.

Even if Gaussian distributions are sufficient to model feature densities, which may not always be the case, the updating mechanism soon becomes complicated and slow if higher dimensional classifiers are desired.

SUMMARY OF THE INVENTION

The embodiments of the invention provide a method for adaptively boosting a classifier while classifying data samples. The classifier can be used to track objects in a video. In this application, the classified samples are foreground and background pixels, and the method treats object tracking as a binary classification problem. A set of weak classifiers is trained to distinguish between and object and the background in a sequence of frames of a video acquired of a scene. The training is performed as the video is processed. That is, the invention works adaptively in real-time, and can adapt to scene and lighting changes.

A feature vector is constructed for every pixel in each frame. The feature vector is used to training the weak classifiers. The weak classifiers classify separate pixels that are associated with the object from pixels that are associated with the background. The set of weak classifiers are combined into a strong classifier.

One embodiment of the invention provides on-line boosting. In the on-line boosting according to the invention, the weak classifiers are adapted over time according to the input samples to account for scene changes. In the prior art, entire weak classifiers are typically deleted as soon as their error rates exceed a predetermined threshold.

BRIEF DESCRIPTION OF THE DRAWINGS

FIG. 2 is a pseudo code for on-line boosting and weak learning according to an embodiment of the invention;

FIGS. 4A-4F are diagrams of the classifiers of FIG. 3 updated over time; and

DETAILED DESCRIPTION OF THE PREFERRED EMBODIMENT

The invention provides a method for adaptively updating a boosted classifier, which is a combination of weak classifiers. The boosted classifier is trained with initial samples. Accumulation matrices are updated according to new samples and old samples. The weak classifiers are updated using the new samples, and contributions of old samples deleted from the weak classifiers to adapt the boosted classifier.

The classifier can be used to track an object in a sequence of frames (images) of a video acquired of a scene by a camera. The invention allows a changing scene and a moving camera. The invention treats object tracking as a binary classification problem with the object being in the 'foreground' and the remainder of the scene being the 'background'. A set of weak classifiers is updated for each frame. The weak classifiers are combined into a strong classifier. The strong classifier identifies the object from the background, and enables object tracking.

The invention does not represent the object explicitly. Instead, the set of classifiers determines whether a particular pixel is associated with the object, or with the background. Each weak classifier is trained on positive and negative training sample. Positive samples are associated with the object and negative samples are associated with the background.

Figure 1:
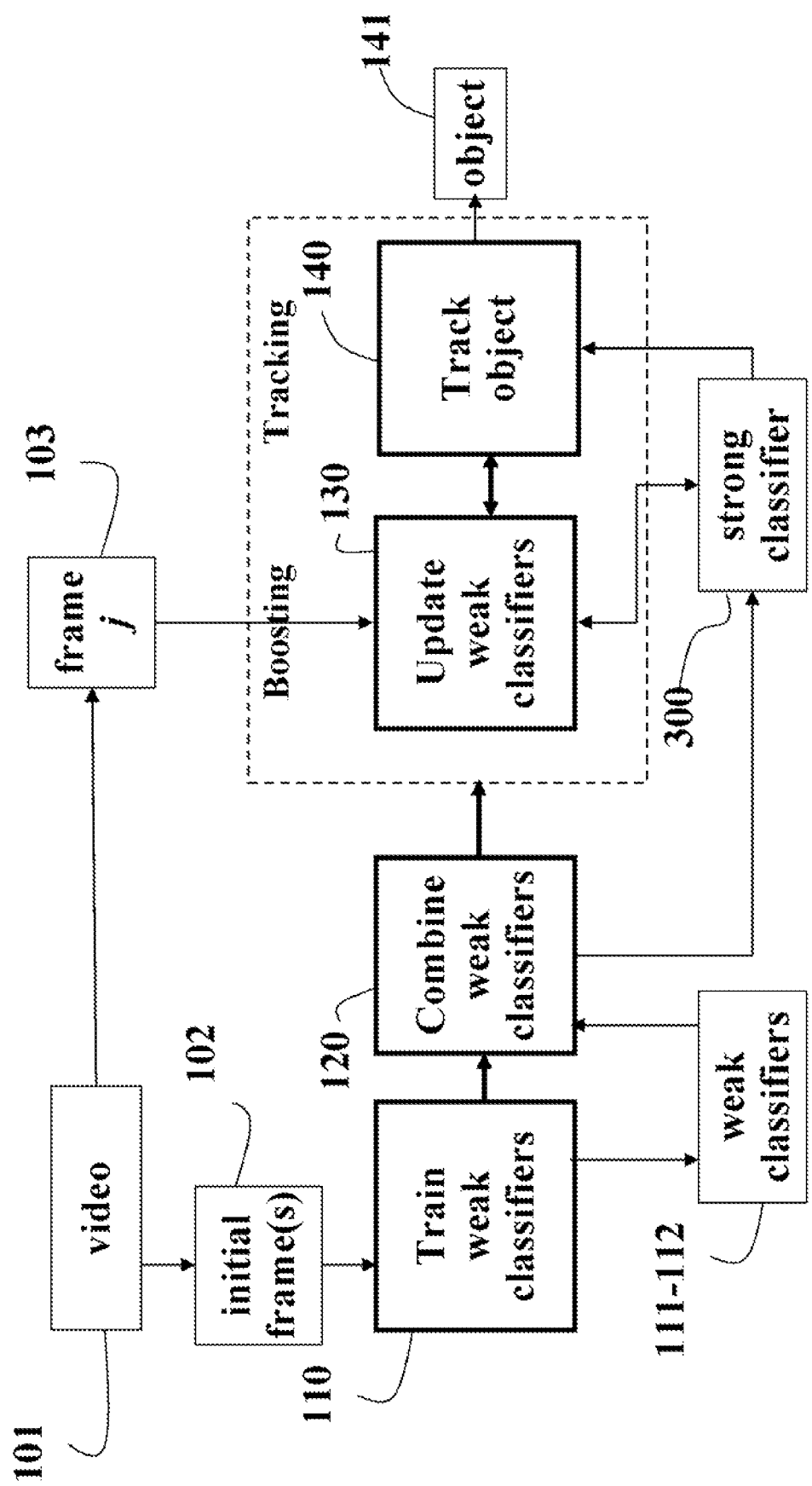
FIG. 1 is a block diagram of a method for tracking an object using a strong linear classifier according to an embodiment of the invention.

As shown in FIG. 1, the embodiments of our invention provide a method for tracking an object in a sequence of frames (video) 101 Samples (pixels) in one or more initial images 102 of a video 101 acquired of a scene are used to train 110 a set of weak classifiers 111-112. For example, eight classifiers are used. However, this number can vary depending on the application and the easy or difficulty of the classification task.

For an example face tracking application, the training uses features extracted from 'face' pixels as postive samples (+1), and features extracted from 'background' or non-face pixels as negative samples (−1).

For each pixel in the current frame, we extract a d-dimensional feature vector that characterizes local edge and texture information near the pixel. For example, the feature vector is 11-dimensional. The feature vector is a combination of, e.g., eight bins of a local orientation histogram based on intensity gradients and three pixel colors (RGB). The 8-bin local orientation histogram is determined over a 5×5 window centered on the pixel. The window is scanned over the image, pixel-by-pixel, to obtain the feature vectors.

To improve performance, only edges that are above some predetermined threshold, e.g., ten intensity values, are counted. These features are easy to extract and convey sufficient edge information for object detection. The feature vector is a count of oriented edges in a local neighborhood of pixels. For example, a feature vector for a given pixel can indicated three horizontal edges, two vertical edges and no diagonal edges in the vicinity of the pixel.

This representation has several advantages. First, the representation is less sensitive to illumination changes because the feature vector does depend on the length of the edge, only that the edge is above some threshold, e.g., ten intensity values. Second, the feature vector gives a local description of pixels that is invariant to small image plane transformations.

Practically, the feature vector is an 11-dimensional vector that includes the RGB values of the pixels as well as the histogram of the number of oriented edges in the 5×5 window. That is, all edges in the window that are above the threshold are located and counted, and the edges are clustered into bins according to their orientation and count.

Other features, such as those obtained from a bank of filters, can also be used. Other classifiers, such as stumps, i.e., single node decision trees or perceptrons, can be used instead of the least-squares based classifier. In the preferred embodiment, the same features are used for all classifiers. However, other techniques, such as fusing various cues, can improve the tracking.

The weak classifiers are combined 120 into a strong classifier 300. New samples from subsequent frames 103 are used to update 130 the weak classifiers in on-line and dynamic manner to account for changes in the scene. At the same time, old samples, which no longer are representative of the scene and therefore are unreliable, are deleted. The updated boosted classifier can then be used to track 140 an object 141

During the updating step 130, weak classifiers are retained if their error rates is less than a predetermined threshold, e.g., 0.5. In the prior art, weak classifiers are simply discarded when they are no longer useful. Instead, we adapt the weak classifiers to scene changes until the weak classifiers are no longer useful. This simplifies the training of the classifier, especially if higher dimensional weak classifiers are used.

The underlying idea for our object tracking is to adapt the boosted classifier incrementally and dynamically, in an on-line manner, as new samples in frames 103 of the video 101 are acquired and processed for object tracking 140. This is in contrast with conventional batch training, where the classifier is constructed from a video, before the video is processed for object tracing.

We update 130 the weak classifiers 111-112 to adapt to the scene changes as long as the classifiers are useful. We provide a computationally efficient process way to adapt to new samples in a way that 'remembers' old samples.

Adaptive Linear Regressor

A matrix X includes a set of N samples, e.g., feature vectors x. The corresponding classification labels for these samples are stored in a vector $y \in \{-1, 1\}^N$. The labels indicate a binary classification of the samples. To solve a linear relation $$X\tilde{\beta} = y$$

by a weighted least squares method, we minimize an error function $$(y - X\tilde{\beta})^T W (y - X\tilde{\beta}),$$

where T is the transpose operator, and W is a diagonal matrix constructed from a weight vector w for the samples. The linear coefficients $\tilde{\beta}$ that minimizes the error are given by $$\tilde{\beta} = (X^T W X)^{-1} X^T W y,$$

which represents a probability distribution on the samples used in the boosted classifier. It will become clear in the following why we use a weighted regression in our method.

Considering an intercept in the linear relation in Equation 1. We can rewrite the solution by breaking down the components:

$$\begin{aligned}\beta &= [\tilde{\beta} \quad \beta_0]^T \\ &= ([X \quad 1]^T W [X \quad 1])^{-1} [X \quad 1]^T W y \\ &= \begin{bmatrix} X^T W X & X^T W 1 \\ 1^T W X & 1^T W 1 \end{bmatrix}^{-1}\end{aligned} \quad (2)$$

-continued $$= \begin{bmatrix} X^T W y \\ 1^T W y \end{bmatrix}.$$

The matrix $X_+ \in R^{N_+ \times L}$ contains new samples, and the vector $y_{+1}$ contain the classification labels of the new samples. It can be shown that the new linear coefficient $\beta$ for the combined old and new samples, i.e., $[X \ X_+]^T$, can be determined by adding quantities pertaining only to new samples.

$$\beta = \begin{bmatrix} X^T W X + X_+^T W_+ X_+ & X^T W 1 + X_+^T W_+ 1_+ \\ 1^T W X + 1_+^T W_+ X_+ & 1^T W 1 + 1_+^T W_+ 1_+ \end{bmatrix}^{-1} \begin{bmatrix} X^T W y + X_+^T W_+ y_+ \\ 1^T W y + 1_+^T W_+ y_+ \end{bmatrix}. \quad (3)$$

Notice that to determine the coefficients $\beta$ for all the samples processed so far, we only determine the quantities related to new samples each time the samples are processed.

A backward accumulation matrix that contains the contribution of the new samples is $$\begin{pmatrix} X_+^T W_+ X_+ & X_+^T W_+ 1 \\ 1^T W_+ X_+ & 1^T W_+ 1 \end{pmatrix}^{-1} \begin{pmatrix} X_+^T W_+ y_+ \\ 1^T W_+ y_+ \end{pmatrix}.$$

The new matrix (of vectors) added to the old matrices of size L×L(L), which is usually small. Therefore, the memory requirement is low.

Upon arrival of every new sample, the linear relation adapts to scene changes, while retaining the previous characteristics. This phenomenon is described herein as linear regression to 'remember' the old samples ($X_-$). We can also 'forget' some characteristics by subtracting a similar matrix as shown in Equation 4.

$$\beta = \begin{bmatrix} X^T W X - X_{-M}^T W_{-M} X_{-M} & X^T W 1 - X_{-M}^T W_{-M} 1_{-M} \\ 1^T W X - 1_{-M}^T W_{-M} X_{-M} & 1^T W 1 - 1_{-M}^T W_{-M} 1_{-M} \end{bmatrix}^{-1} \quad (4)$$

$$\begin{bmatrix} X^T W y - X_{-M}^T W_{-M} y_{-M} \\ 1^T W y - 1_{-M}^T W_{-M} y_{-M} \end{bmatrix}$$

The duration for which we retain old samples, i.e., the duration of the 'memory' M determines the sensitivity to the changes in the scene.

A forward accumulation matrix that contains contributions of the old samples is $$\begin{pmatrix} X_{-M}^T W_{-M} X_{-M} & X_{-M}^T W_{-M} 1 \\ 1^T W_{-M} X_{-M} & 1^T W_{-M} 1 \end{pmatrix}^{-1} \begin{pmatrix} X_{-M}^T W_{-M} y_{-M} \\ 1^T W_{-M} y_{-M} \end{pmatrix}.$$

We can use linear regressors of the form of $g: R^L \to R$ as described for GentleBoost, see Jerome Friedman, Trevor Hastie, and Robert Tibshirani, "Additive logistic regression: a statistical view of boosting," The Annals of Statistics, 38(2): 337-374, April, 2000, incorporated herein by reference. Alternatively, a threshold version $h: R^L \to \{-1, 1\}$ can be used for a discrete AdaBoost process.

Initially, we train 110 the T weak classifiers 111-112 using discrete AdaBoost on an initial set of samples, e.g., the samples extracted from one or a small number of frames 102 in the video 101. This is done by first determining the linear relation, and then thresholding the response $X\beta$ at zero. For new samples from new frames, each of these weak classifiers is updated according to Equation 3. Then, in every round of boosting, we select the best weak classifier having a minimum weighted classification error and update the weights of the samples associated with the best weak classifier accordingly. To consider the contribution of only M previous samples, we maintain a first in, first out queue of the quantities indicated in Equation 3, and deleted the quantities by subtraction.

FIG. 2 summarizes the on-line boosting step 201, which uses the weak learning procedure 202.

On-Line boosting

For each new set of samples $X_+$, i.e., each new frame:
1. Start with a uniform distribution weight vector w and t=1.
2. Repeat for each frame (set of new samples)
   (a) Train the weak classifiers—WeakTrain(W).

(b) Select the weak classifier $h$ with minimum weighted classification error $- h_t(x) = \arg \min_{1 \leq j \leq J} \sum_j w_i |y_i - h_j(x_i)|.$ (c) Update and normalize the weight vector w.
   (d) Deleted old samples related to $X_{-M}$ according to Equation 4.

WeakTrain(W)
1. Determine new quantities for $X_+$, (what quantities)
2. Train the linear coefficients $\beta$ according to Equation 3.

Figure 3:
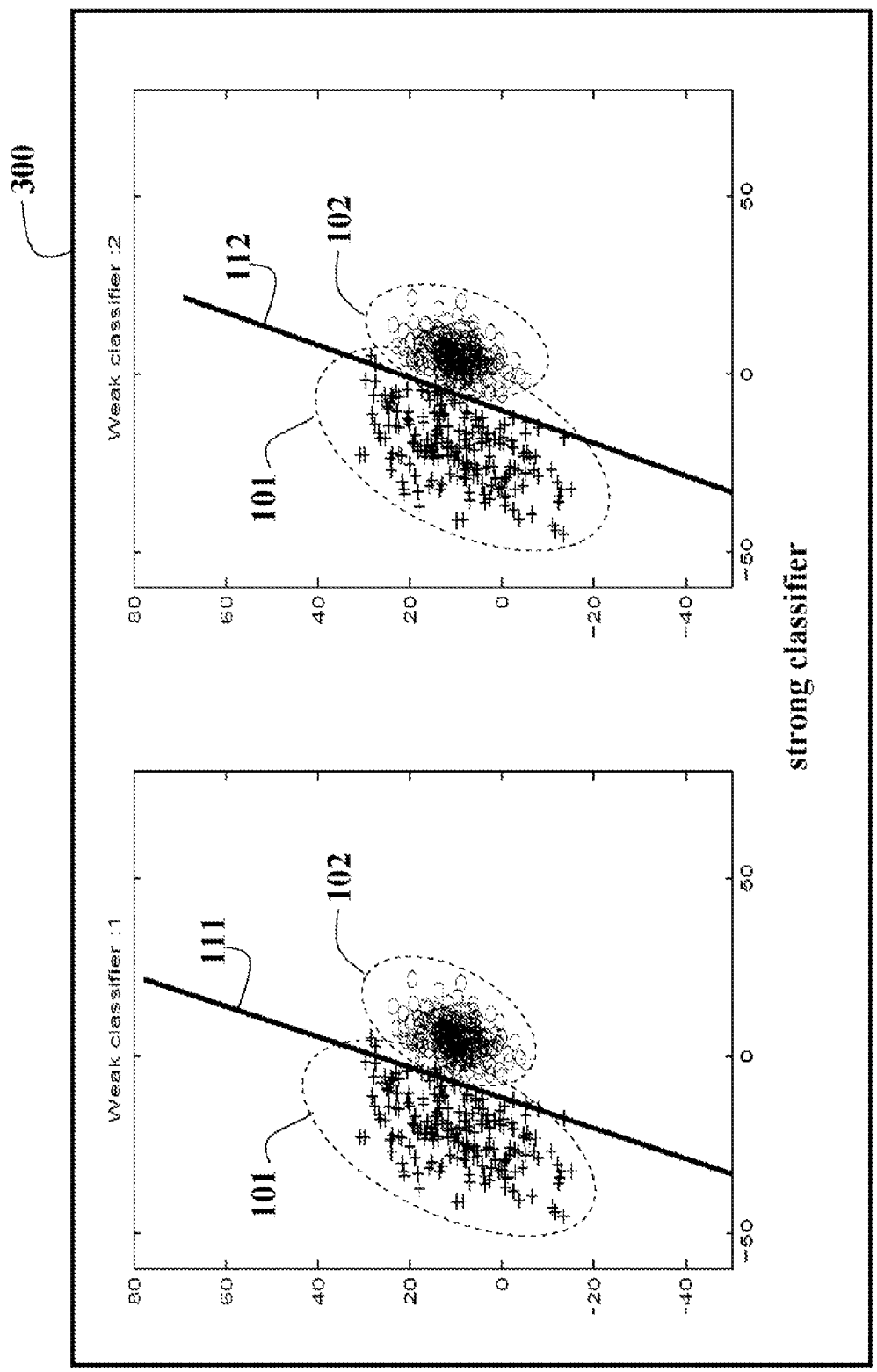

FIG. 3 show our updating process for an example data set. We generate a two dimensional dataset of samples. The vertical and horizontal axes indicate the different dimensions in this two dimensional space where the samples are generated. The circles 101 and crosses 102 denotes samples of two different classes, e.g., objects or not. These samples are generated from 2D Gaussian distributions. The lines 111-112 symbolize the weak classifiers that separate the samples in binary classes.

The starting strong boosted classifier at t=1 (frame 1) is a linear combination 1209 of weak binary classifiers 111-112 trained from the initial dataset 102. The lines are 'fitted' by regressors as described above.

As shown in FIGS. 4A-4F, new samples are added incrementally to the dataset and the weak classifiers are updated accordingly for $t_2, \ldots, t_7$. Over time, 'old' samples are deleted. In FIGS. 4A-4F, notice the gradual shifting of the orientation of the lines as the weak classifiers are adaptively updated as new samples are added, and old samples are deleted, instead of replacing entire weak classifiers as in the prior art. This is better suited for tracking objects in slowly evolving scenes.

Figures 5A, 5B:
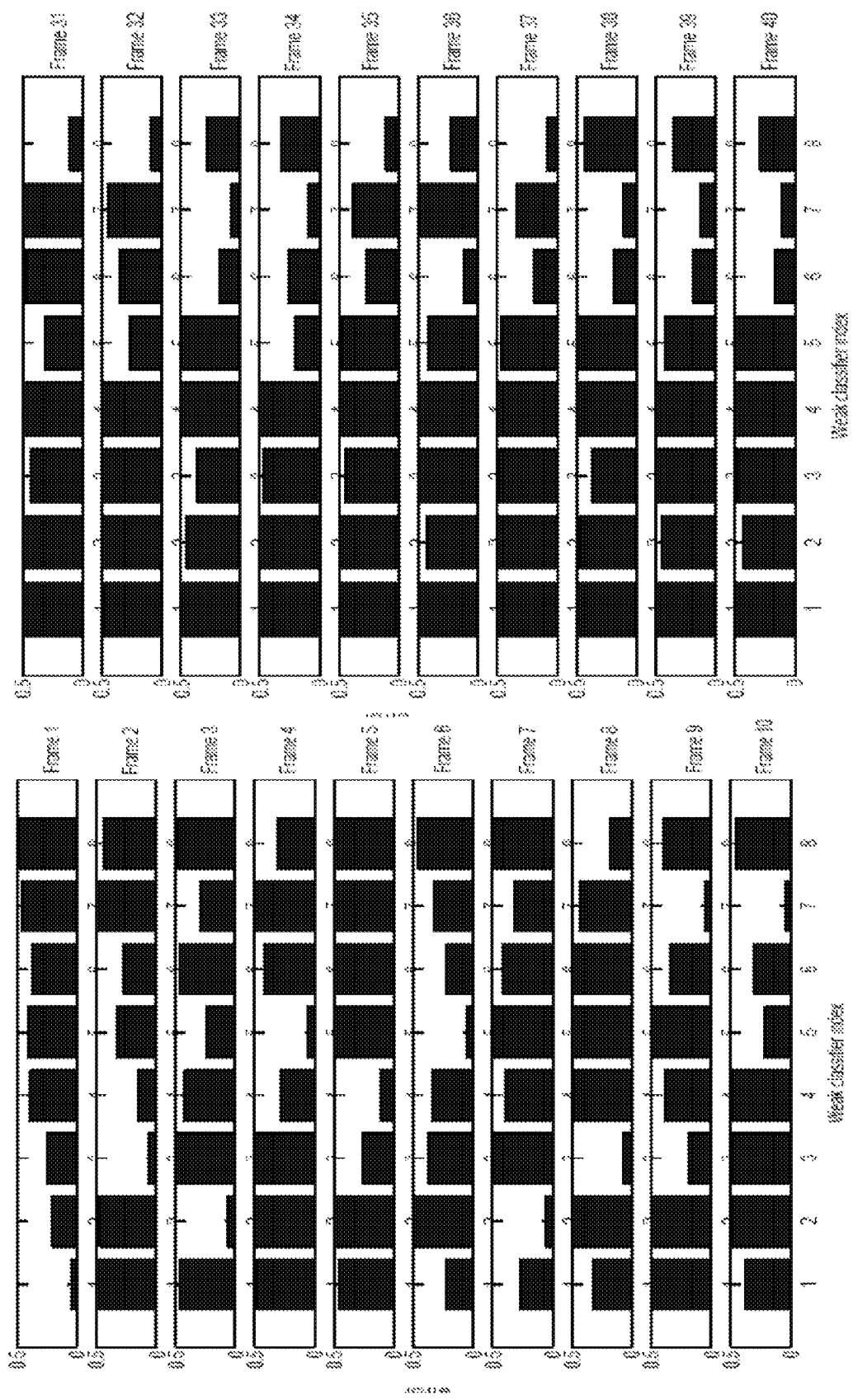
FIGS. 5A and 5B are bar graphs of error rates of weak classifiers over time.

FIGS. 5A and 5B shows the error rate of eight weak classifiers over time, e.g., frames $t_1, \ldots, t_{10}$ and frames $t_{31}, \ldots, t_{40}$, respectively. The first row of FIG. 5A shows the errors produced by each classifier, represented as each column in classifying a face in the first frame. If the error is $\geq 0.5$, the weak classifier is not combined in the strong classifier. However, it not deleted. Notice the error characteristics of linear classifier 7 in frames 1 to 5 and in frames 9, 10. Despite an initial poor performance, the same linear classifier turns out to be very useful in latter frames due to our adaptation. It should be pointed out here that, the boosting weights on samples are important role in determining the error of a linear classifier. It may very well be the case that classifier 7 was trained with more 'difficult' examples to cause large errors. Later, perhaps due to change in the scene, some new samples are separated well by classifier 7. Therefore, deleting classifiers with high error rates as done in the prior art can be disadvantageous.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for adapting a boosted classifier to new samples, comprising the steps of:
    training a boosted classifier using initial samples, in which the boosted classifier is a combination of weak classifiers;
    updating adaptively, each weak classifier of the boosted classifier, by adding contributions of new samples and deleting contributions of old samples, wherein the samples correspond to foreground pixels and background pixels in frames of a video acquired of a scene by a camera; and
    tracking an object corresponding to the foreground pixels in the video, wherein a matrix X includes N samples, each sample being a feature vector x, and corresponding labels for the samples are stored in a vector $y \in \{-1, 1\}^N$, in which the labels indicate a binary classification of the samples, and a linear relation $X\tilde{\beta}=y$ is solved by a weighted least squares method, which minimizes an error function $$(y-X\tilde{\beta})^T W(y-X\tilde{\beta}),$$

where T is a transpose operator, and W is a diagonal matrix constructed from a weight vector w for the samples, and linear coefficients $\tilde{\beta}$ that minimizes the error are given by $$\tilde{\beta}=(X^T W X)^{-1} X^T W y,$$

which represents a probability distribution on the samples used by the boosted classifier, and wherein the steps are performed in a computer system.

2. The method of claim 1, in which the scene and the object change over time.

3. The method of claim 1, in which a number of weak classifiers in the boosted classifier varies over time.

4. The method of claim 1, in which each pixel is represented by a multi-dimensional feature vector.

5. The method of claim 4, in which the feature vector encodes edge and texture information in video.

6. The method of claim 1, in which a particular weak classifier is retained as long as an error rate of the weak classifier is less than a predetermined threshold.

7. The method of claim 1, in which the linear coefficients for combined data $$\beta=[\tilde{\beta}\beta_0]^T=([X1]^T W[X1])^{-1}[X1]^T W y$$

are determined using the new samples $X_+ \in R^{N_+ \times L}$ and the corresponding labels y+1 by adding new quantities pertaining to only the new samples using a formulation $$\beta = \begin{bmatrix} X^T W X + X_+^T W_+ X_+ & X^T W 1 + X_+^T W_+ 1_+ \\ 1^T W X + 1_+^T W_+ X_+ & 1^T W 1 + 1_+^T W_+ 1_+ \end{bmatrix}^{-1} \begin{bmatrix} X^T W y + X_+^T W_+ y_+ \\ 1^T W y + 1_+^T W_+ y_+ \end{bmatrix}.$$

8. The method of claim 1, in which the contribution of the old samples are removed by subtracting their weights as $$\beta = \begin{bmatrix} X^T W X - X_{-M}^T W_{-M} X_{-M} & X^T W 1 - X_{-M}^T W_{-M} 1_{-M} \\ 1^T W X - 1_{-M}^T W_{-M} X_{-M} & 1^T W 1 - 1_{-M}^T W_{-M} 1_{-M} \end{bmatrix}^{-1}$$

$$\begin{bmatrix} X^T W y - X_{-M}^T W_{-M} y_{-M} \\ 1^T W y - 1_{-M}^T W_{-M} y_{-M} \end{bmatrix}.$$

9. The method of claim 2, in which a duration for which the old samples are retained determines a sensitivity of the boosted classifier to the changes in the scene and the object.

10. The method of claim 1, in which each frame results in the new samples, and for each frame further comprising:
    selecting a best weak classifier having a minimum weighted classification error; and
    updating weights of the new samples and old samples associated with the best weak classifier accordingly.

11. The method of claim 1, in which the boosted classifier is fitted to the new samples by a linear regressor using a Gentle-boost update function.

12. The method of claim 1, in which the boosted classifier is fitted to the new samples by a linear regressor using a discrete Adaboost update functions.

* * * * *